(No Model.)

R. HIATT.
WAGON.

No. 600,200. Patented Mar. 8, 1898.

WITNESSES:
J. A. Walsh,
C. C. Stoner

INVENTOR
Rufus Hiatt,
BY
H. D. Nealy.
ATTORNEY.

THE NORRIS PETERS CO., PHOTO-LITHO., WASHINGTON, D. C.

United States Patent Office.

RUFUS HIATT, OF SHELBURN, INDIANA.

WAGON.

SPECIFICATION forming part of Letters Patent No. 600,200, dated March 8, 1898.

Application filed May 21, 1897. Serial No. 637,642. (No model.)

*To all whom it may concern:*

Be it known that I, RUFUS HIATT, a citizen of the United States, residing at Shelburn, in the county of Sullivan and State of Indiana, have invented certain new and useful Improvements in Wagons; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to new and useful improvements in wagons; and it consists in the novel construction hereinafter described, whereby the said wagon can be more simply and cheaply made than those ordinarily in use; also, it will be lighter, and therefore more readily drawn by the horse or horses. Further, through the manner of hitching the horse to the wagon it is possible to make the line of pull or stress on the most favorable angle, thereby securing to the horse the greatest ease in his work and at the same time the most efficiency, and he is also enabled to draw and turn the wagon without being subjected to the strains and jerks which are common to the wagons in present use.

Figure 1:
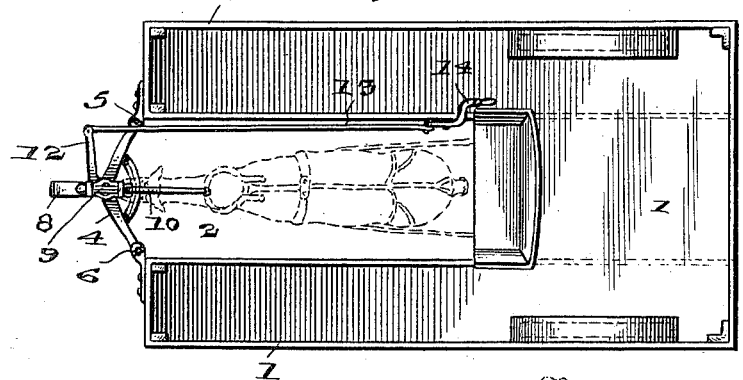
Figure 2:
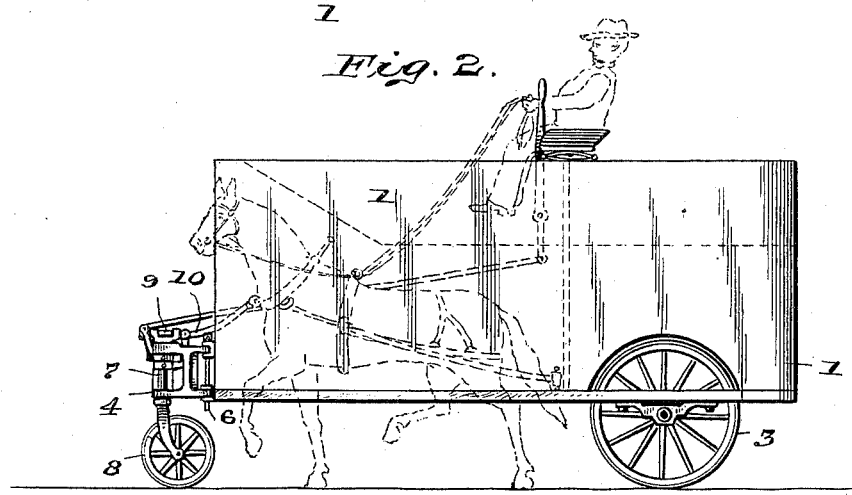
Figure 4:
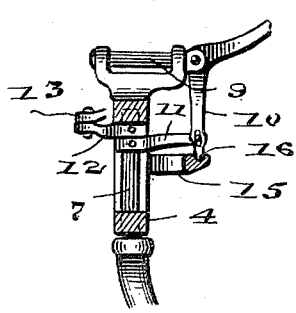
Figure 3:
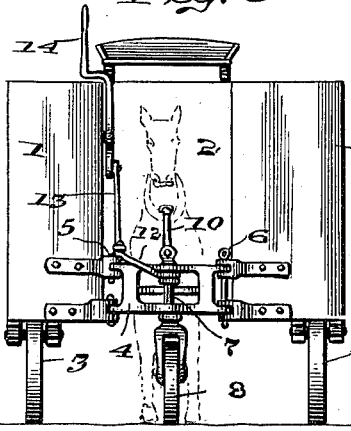
Figure 5:
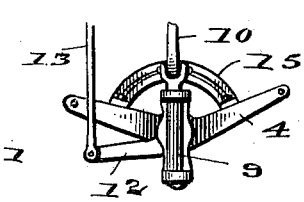

In the drawings, where a simple form of my improved wagon is shown and where the same reference-figures refer to corresponding parts, Figure 1 is a plan view of the wagon, showing the horse in dotted lines attached thereto. Fig. 2 is a side elevation of the same. Fig. 3 is a front elevation. Fig. 4 is an enlarged detail view of the frame carrying the guide-wheel and its connections. Fig. 5 is an enlarged plan view of the same.

In detail, 1 is the body of the wagon, which is of rectangular form and may be of any desired length, breadth, and height. It has a central opening or recess 2 from the forward end sufficient in width for one or more horses as may be used in drawing the wagon, or the recess may extend the full length of the wagon, as indicated in dotted lines in Figs. 1 and 2.

3 are the rear wheels, provided with suitable guards, and may be connected to the body 1 in any ordinary way.

4 is a frame which is hinged to one side of the opening 2 in front at 5 and may be closed across said opening and held in place by the locking-pin 6, this frame bracing or reinforcing the wagon-body at that point.

7 is a vertical shaft carried centrally in the frame 5, and a front or guide wheel 8 is mounted in the forked lower end of said shaft, this wheel being preferably smaller than the rear wheels of the wagon. The swinging frame admits of the horse being backed into the recess or opening 2 and hitched to the single-tree in the rear of the recess in the ordinary manner, no shafts being required, as the guiding of the wagon is accomplished through the front pivoted wheel of the wagon by the horse or the driver, or both, as hereinafter described.

At the top of the frame 4 is a short arm or shaft 9, carried in suitable bearings on the frame, and to the inner end of this is pivoted a lever 10, the upper and inner end of which is attached to the breast-collar of the horse, the lower end being slotted and pivotally attached to a short arm 11, adjustably attached to the shaft 7, so that the front or guide wheel will be turned in whichever direction the horse turns.

12 is an arm or lever adjustably secured to the shaft 7 and through a rod 13 is connected to a lever 14 within reach of the driver's seat, so that the driver may at any time aid the horse in turning the wagon and may practically control the turning.

15 is a segment carried by the frame 4 and has a central depression 16, in which the lower end of the lever 11 is lightly held, so that the guide-wheel is not allowed to wabble when moving in a straight line, and yet with little effort on the part of the horse or driver the lever 10 may be moved out of the depression 16 and the guide-wheel turned from a straight line.

Any desired form of brakes may be used on my wagon, and would be operated by the driver in any convenient way. If desired, the top and sides of the body of the wagon may be removable; but these are mere matters of convenience. Likewise, if desired, the wagon-bed may be arched or carried over the horse's back, as shown in Fig. 2, making the wagon still more commodious.

As stated before, two or more horses may be used in drawing the wagon and would be hitched in the same manner as a single one; also, the animals may be introduced from the rear of the wagon, where the recess extends from the rear either a part of the length of the bed or entirely through, and in the latter case the frame in front would be fixed and the rear one swinging or movable.

Changes may be made in the form and construction of my improved wagon without departing from the spirit of my invention; but

What I claim as new, and desire to secure by Letters Patent of the United States, is—

1. In a wagon to be propelled by animal power, a body mounted on wheels, said body composed of the two side sections inclosing a central opening or recess wherein the animal may be placed to operate said wagon, suitable connections to bind the two parts of the body together, and a guide-wheel mounted in a frame which closes the animal within the recess of the wagon, said wheel adapted to be operated through suitable connections by the animal propelling the wagon, substantially as set forth.

2. In a wagon, a body mounted on wheels and provided with a central opening or recess in which the horse is adapted to be hitched, a locking-frame adapted to close said opening, and a guide-wheel carried by said frame, substantially as set forth.

3. In a wagon, a body mounted on wheels and provided with a central opening or recess in which the horse is adapted to be hitched, a locking-frame adapted to close the front of said opening, a guide-wheel carried by said frame and connections between said guide-wheel and the animal's harness, whereby the wagon will be guided by the said horse, substantially as set forth.

4. In a wagon, a body mounted on a pair of rear wheels and provided with a central opening in which the animal is adapted to be hitched, a locking-frame adapted to close the front of said opening, a guide-wheel carried by said frame, a double lever connected between the operating-shaft of the guide-wheel and the animal's harness, and suitable levers connected between said guide-wheel and the driver's seat, whereby said wagon may be steered by either the animal, or the driver, or both, substantially as set forth.

In testimony whereof I affix my signature in presence of two witnesses.

RUFUS HIATT.

Witnesses:
SPENCER HIATT,
JOHN L. SINES.